Patented Feb. 8, 1944

2,341,329

UNITED STATES PATENT OFFICE 2,341,329

REMOVAL OF COPPER FROM HYDROCARBON OILS

Robert J. Myers, Rydal, Pa., assignor to The Resinous Products & Chemical Company, Philadelphia, Pa., a corporation of Delaware No Drawing. Application May 19, 1942, Serial No. 443,664

6 Claims. (Cl. 196—30)

This invention relates to removing small amounts of copper from hydrocarbon oils. More particularly this invention relates to reducing the copper content of volatile hydrocarbon oils, including naphthas, kerosenes, and gasolines, which have been subjected to treatment with copper reagents, or have otherwise become contaminated with copper, by contacting said oils with a heat-hardened, water- and oil-insoluble carbamide-formaldehyde type resinous composition having multiple $$-HN-\overset{|}{\underset{|}{C}}-NH-$$

linkages.

Treatment of sulfur-containing hydrocarbon oils with copper reagents advantageously improves the oils as to sulfur content, odor, and appearance, but often leaves the treated oils in an unstable condition, as a result of the catalytic action of small amounts of copper retained by the oils. As is known, copper and its compounds promote gum formation and offset the value of antioxidants which are commonly used to stabilize hydrocarbons against autoxidation and its subsequent ill effects. While such effects may be delayed by increased doses of inhibitors and addition of special inhibitors to react with the copper such procedures are relatively expensive and yet have heretofore been justified in many cases, because removal of copper by purification has been even more expensive. In some cases conventional methods of purification are unsuccessful in removing unstabilizing amounts of copper, because the copper exists in some type of organic complex or chelate compound as well as in combination with organic acids, mercaptans, and the like.

It is now found that hydrocarbon oils containing unstabilizing amounts of copper are effectively improved in stability and in susceptibility to the action of antioxidants by contacting them with particles of a heat-hardened, insoluble resinous composition of the type herein described and separating said oil from said resinous composition. The treatment of oil as described may be the sole step for removal of copper or it may be one of several steps. Thus, a copper-sweetened hydrocarbon fluid may be washed with water, if desired, with aeration, and then treated with the said resinous composition. This method is particularly economical. In the contact of a hydrocarbon fluid and the resinous composition sufficient time of contact must be allowed to permit thorough treatment. In a continuous flow process this may be controlled by the depth of bed, or by the rate of flow therethrough, or by both of these factors.

As the absorbent for copper in hydrocarbon fluids there is used a resinous composition which is insoluble in water, dilute solutions of acid or alkali, or hydrocarbon oils and which contains multiple

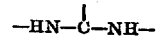

linkages. Such resinous compositions are obtained from the reaction of formaldehyde with resin-forming carbamides, resin-forming triazines, and closely related compounds or mixtures thereof, including urea, thiourea, biuret, guanidine, dicyanodiamide, ammelide, melamine, ammeline, thioammeline, $\beta,\beta'$-bis-thioammeline diethyl ether, or the like. In the preparation of suitable resinous compositions, formaldehyde and a carbamide type of compound are condensed in a conventional way, usually in an aqueous system, and then heated to convert the primary condensate to a hard, insoluble product, which is crushed to the particle size most useful for the intended method of application. If desired, an acid or acid-type catalyst may be used to hasten the insolubilizing action. The condensate may be extended with carriers of organic or inorganic nature.

The process for removing copper from hydrocarbon oils is simple. All that is required is that copper-containing oil be contacted with an extended surface of one of the above described resinous compositions. This composition in finely divided form may be added to a batch of the oil to be treated, stirred, or mixed therewith, and allowed to settle, whereupon the oil and resin are separated. In the preferred form of this invention a copper-containing oil is passed through a bed of the resinous composition in granular form at normal pressure or at increased or reduced pressure with allowance of sufficient time of contact to permit intimate contact of oil and resin. Since the amounts of copper held by oils from copper-sweetening or from contamination with copper in other ways, such as contact with copper or copper containing apparatus, is relatively small, large volumes of oil may be purified with a limited amount of the prescribed type of resin. The process described is usually carried out at temperatures of 60° to 100° F., but may be performed at somewhat higher or lower temperatures.

When the resin has become relatively inefficient as an absorbent for copper, it may be discarded or it may be revivified by a treatment such as washing with an ammonia solution or washing with a solution of an acid, such as hydrochloric acid, followed by an alkaline solution such as a solution of sodium hydroxide or sodium carbonate.

The process of this invention was applied to a cracked gasoline which had been copper-sweetened with cupric chloride and washed with water, but which still contained 1.2 P. P. M. of copper, apparently in a chelate form. This gasoline was passed by downflow through a glass column 1" x 24" packed with 124 cc. of an insoluble resin prepared by heating a urea-formaldehyde condensate in a 50% aqueous solution at 100°–105° C. for 23 hours to form a porous mass which was crushed and sifted to a 10/40 mesh size. The effluent was analyzed for copper colorimetrically with sodium diethyl dithiocarbamate and found to contain about 0.05 P. P. M. of copper.

Another sample of gasoline which had been copper-sweetened and washed to remove copper was found to contain about 0.2 P. P. M. of copper. After contact in a 1" column with 97 cc. of a resin prepared by heating at 100° C.–105° C. a 40% aqueous solution of a condensate from 9 parts of urea, one part of thiourea, and excess formaldehyde until a hard porous mass resulted and grinding the mass to a 10 to 40 mesh size, the gasoline contained less than 0.07 P. P. M. of copper and was stable upon the addition of 0.002% of a benzyl aminophenol.

A batch of naphtha containing about 2 P. P. M. of copper was passed downflow through a 40 inch column containing about 200 cc. of a resin prepared from a 40% aqueous solution of a urea-formaldehyde condensate by adding dilute sulfuric acid until a pH of two was reached, permitting the solution to stand two hours until an opaque gel was formed, heating the gel in an oven at 105° C. for 16 hours to form a transparent, glassy solid, crushing the solid to a 10/40 mesh size, and heating the granules at 105° C. for five hours. The naphtha contained less than 0.05 P. P. M. of copper after treatment.

In place of the urea and thiourea condensates used above there may be used melamine-formaldehyde, or urea-melamine-formaldehyde resins with similar satisfactory results. The use of melamine increases hardness and insolubility.

A melamine-formaldehyde condensate was prepared in aqueous solution, which was acidified and heated in an oven at 100° C. to 105° C. for overnight. The resulting hard resin was crushed, sifted to a 20/40 mesh size, and the resulting granules heated at 105° C. for an hour. The dried particles were placed in a tube. A gasoline containing about 3 P. P. M. of copper was poured through the packed column. In a single pass the copper content was reduced by over 75%.

By contacting copper containing hydrocarbon oils with formaldehyde resins of urea, melamine, and the like there may be removed troublesome traces of copper. The resins also remove other impurities which tend to make gasoline and other hydrocarbon products unstable. The resins have relatively high capacity for copper and remove the copper well below the levels which cause instability or which promote autoxidation. The process is particularly applicable to petroleum distillates, which may be further stabilized with nominal and economical amounts of inhibitors.

I claim:

1. The process of removing copper compounds from hydrocarbon oils containing unstabilizing amounts of copper which comprises contacting said oils with particles of a resinous composition which is insoluble in water and hydrocarbon oils, which contains multiple

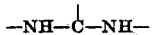

linkages and which is formed by reaction of formaldehyde and at least one resin-forming compound selected from the class consisting of carbamides and triazines.

2. The process of removing copper compounds from petroleum distillates which have been copper-sweetened which comprises contacting said copper-sweetened distillates with particles of a water- and oil-insoluble urea-formaldehyde resin.

3. The process of removing copper compounds from petroleum distillates which have been copper-sweetened which comprises contacting said copper-sweetened distillates with particles of a water- and oil-insoluble resin obtained by reacting urea, melamine, and formaldehyde.

4. The process of removing copper compounds from hydrocarbon distillates containing unstabilizing amounts of copper which comprises washing said distillate with water and contacting the washed distillate with particles of a resinous composition which is insoluble in water and hydrocarbon distillates, which contains multiple

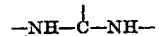

linkages and which is formed by reaction of formaldehyde and at least one resin-forming compound selected from the class consisting of carbamides and triazines, and separating distillate and resinous composition.

5. The process of removing copper compounds from hydrocarbon distillates containing unstabilizing amounts of copper which comprises washing said distillate with water and contacting the washed distillate with particles of a water- and oil-insoluble urea-formaldehyde resin, and separating distillate and particles of resin.

6. The process the removing copper compounds from hydrocarbon distillates containing unstabilizing amounts of copper which comprises washing said distillate with water and contacting the washed distillate with particles of a water- and oil-insoluble resin obtained by reacting urea, melamine, and formaldehyde to a hardened state, and separating distillate and resin.

ROBERT J. MYERS.